United States Patent Office 3,702,199
Patented Nov. 7, 1972

3,702,199
ASSEMBLIES OF TUBULAR MEMBERS
Geoffrey N. Brooks, Stalybridge, and John L. F. Crompton, Handforth, England, assignors to Dunlop Holdings Limited, London, England
Filed June 17, 1970, Ser. No. 46,976
Claims priority, application Great Britain, July 16, 1969, 35,705/69
Int. Cl. F16l 23/00
U.S. Cl. 285—55     2 Claims

ABSTRACT OF THE DISCLOSURE

An assembly of tubular members in which two tubular members each having an outer shell and an inner protective lining such as an elastomer lining are coupled together at adjacent ends. The lining of each tubular member extends beyond the outer shell at the respective adjacent end and each tubular member carries an annular coupling flange, the coupling flanges being clamped together. An annular insert lies between the tubular members and at least part of the extending portion of each lining is compressed between the annular insert and an inner face of the respective coupling flange at an acute angle to the longitudinal axis of the tubular members and is in fluid tight sealing contact with the insert and the inner face of the respective coupling flange.

---

This invention relates to assemblies of protectively lined tubular members, particularly elastomer-lined fibreglass-resin pipe, and fittings therefor.

The present invention provides in one aspect, an assembly of tubular members comprising:

(a) two tubular members each having an outer shell bonded to an inner protective lining and being coupled together at adjacent ends, the lining of each tubular member extending beyond the outer shell at the respective adjacent end, each of said members carrying an annular coupling flange, the coupling flanges being clamped together, and (b) an annular insert lying between the tubular members, at least part of the extending portion of each lining being compressed between the annular insert and an inner face of the respective coupling flange at an acute angle to the longitudinal axis of the tubular members, and being in fluid-tight sealing contact with said insert and said inner face.

The present invention in another aspect provides a kit of parts for an assembly of tubular members comprising:

(a) two tubular members, each having an inner protective lining, to be coupled together at adjacent ends, the lining of each tubular member being adapted to extend beyond the outer shell of the tubular member at the respective adjacent end, (b) two annular coupling flanges to be carried respectively on the tubular members and to be clamped together, and (c) an annular insert to lie between the tubular members, the coupling flange and insert being adapted so that when the lining is extended beyond the outer shell, the coupling flanges are placed on the tubular members and the annular insert is placed between the tubular members, at least part of the extending portion of each lining is compressed at an acute angle to the longitudinal axis of the tubular members between the annular insert and an inner face of the respective coupling flange and is in sealing contact with the insert and said inner face when the coupling flanges are clamped together.

In general, the lining is an elastomer lining and the invention is particularly suitable when applied to piping comprising an outer shell of a fiberglass-resin composition bonded to an elastomer lining, such as the pipe of our U.K. Pat. No. 1,116,572.

In a preferred embodiment, the inner face of the coupling flange bearing against the outer surface of the extending portion of the lining is frusto-conical in shape. The frusto-conical face may have one or more annular ribs thereon to improve sealing contact with the elastomer lining. The coupling flange also has another inner face in contact with the outer shell. The coupling flange may be of any suitable relatively rigid material, e.g. a rigid plastics material such as fibreglass-resin material, or metal such as steel, and may be in more than one part. For example, it may comprise two annular parts, a first part such as a collar or stub flange providing the inner face to bear against the outer surface of the extending portion of the lining and a second part such as a clamping flange or plate holding the first part in position and accommodating the means, e.g. bolts, for connecting the two flanges. The first part preferably has an inner face bonded to the outer shell of the tubular member.

The annular insert has a face bearing against the inner surface of the extending portion of the respective lining, and in a preferred embodiment when the aforementioned inner face of the coupling flange is frusto-conical, this face of the insert is also frusto-conical or the insert may have a tapering stepped surface in sealing contact with the extending portion of the respective lining. Where the face is frusto-conical it may have one or more annular ribs thereon to improve sealing contact with the elastomer lining. The insert is conveniently made of a rigid material such as polypropylene, high density polyethylene, polyvinyl chloride, polytetrafluoroethylene, phenolic-resin materials, phenoxy resin materials, polyurethane, steel or hard natural or synthetic rubbers. The insert may be in more than one part, and is preferably in two annular parts to permit easy construction and dismantling of the assembly, each part bearing against the inner surface of the extending portion of the respective lining. The parts are in sealing contact with each other and to ensure a good seal the two parts preferably have a washer of rubber or other suitable material placed between them.

Various embodiments of the invention relating to an assembly incorporating two lengths of the elastomer-lined fibreglass-resin pipe of our U.K. Pat. No. 1,116,572 are now described by way of example with reference to the accompanying drawings, in which.

Figure 1:
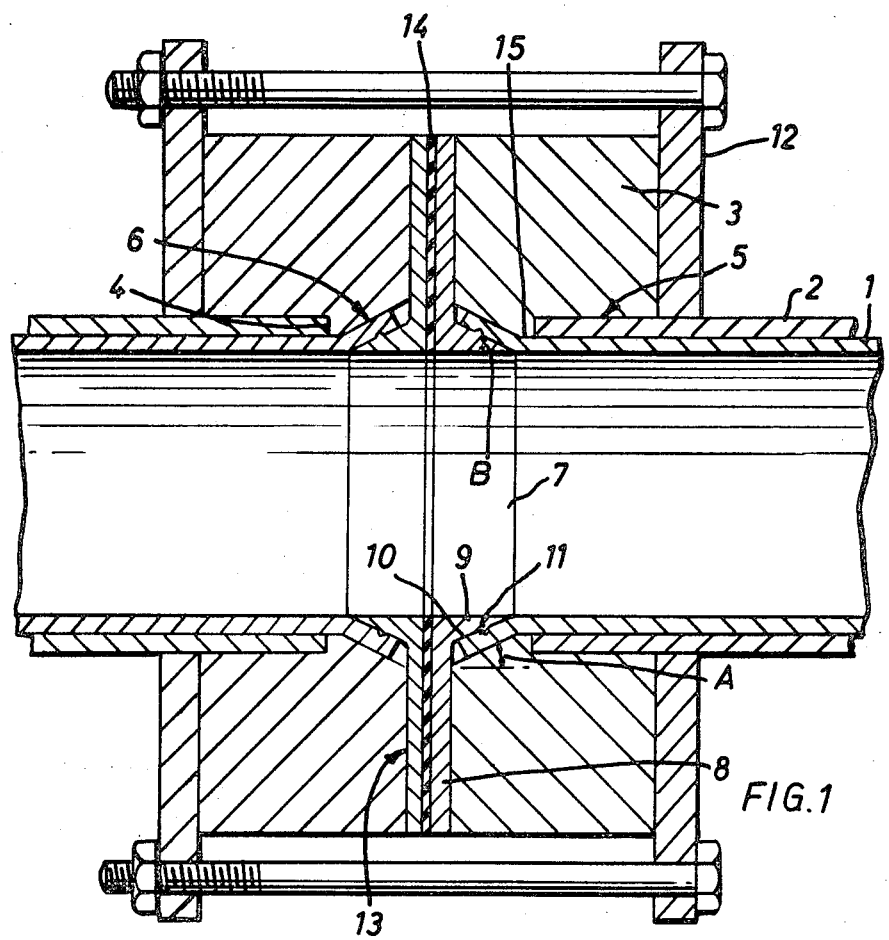
FIG. 1 is a sectional elevation of an assembly of two lengths of elastomer-lined fibreglass-resin pipe.

In FIG. 1 the various components of the assembly are shown in the sealing position. Each pipe length comprises an elastomer lining 1 bonded to a fibreglass-resin outer shell 2. At their adjacent ends, the lining of each length extends beyond the outer shell, the extending portion of the lining being denoted by reference numeral 15. Each coupling flange is in two annular parts, comprising a collar 3 of fibreglass-resin material which is a push fit over the outer shell 2, and has a shoulder 4 in contact with the end of the outer shell, a face 5 bonded to the outer shell and a frusto-conical face 6 at an acute angle A to the longitudinal axis of the collar, i.e. to the longitudinal axis of the pipe lengths; and a metal clamping plate or flange 12 which is a sliding fit over the outer shell and has holes accommodating bolts by means of which the two flanges are held together.

The annular insert is in two like annular parts 7 of polypropylene whose internal bore is equal in diameter to the internal diameter of the pipe lengths, a rubber washer 14 being located between the parts 7 to ensure that a good seal is produced between them. Each part 7 has a flanged section 8 integral with a frusto-conical section 9, the face 10 of which has an annular rib 11 embedded in the extending portion 15 of the respective elastomer lining. The frusto-conical face 10 is at an acute angle B to the longitudinal axis of the part 7, i.e. to the longitudinal axis of the pipe lengths, and the flanged section 8 is in contact with the face 13 of the respective collar 3.

The two clamping plates 12 are bolted together so that the face 6 of each collar 3 is in sealing contact with the outer surface of the extending portion 15 of the respective elastomer lining, and the face 10 of each part 7 is in sealing contact with the inner surface of the respective extending portion 15.

In the construction of the above pipe assembly, a length of the outer shell 2 of the elastomer-lined pipe is cut away to leave an extending portion 15 of the elastomer lining 1, and the clamping plate 12 is pushed onto the pipe length and left until required for the final bolting operation. The collar 3 is pushed onto the pipe length so that the shoulder 4 of the collar is in contact with the end of the outer shell 2. The collar 3 is bonded to the outer shell by injecting a suitable adhesive between them or by applying an adhesive to the mating surfaces prior to the collar being pushed onto the pipe length.

A second pipe length is prepared in the same manner and the prepared ends of the two pipe lengths are brought together. The parts 7 of the annular insert are located in the internal bore of the lining 1; to assist this location the lining may be chamferred slightly at the end of the extending portion 15. The rubber washer 14 is placed between the parts 7 and the clamping plates 12 are bolted together so that the extending portions 15 of the elastomer linings are in sealing engagement with the frusto-conical faces 6 of the collars 3 and the frusto-conical faces 10 of the parts 7. The annular ribs 11 on the faces 10 embed themselves in the extending portions 15 of the linings and accommodate any variations in the thickness of the linings.

The dimensions of the collars 3 and the parts 7 are such that when the flanger sections 8 of the parts 7 are in contact with the corresponding faces 13 of the collars 3, then sealing engagement between the extending portions 15 of the elastomer linings and the frusto-conical faces of the insert parts and the collars is assured.

Figure 2:
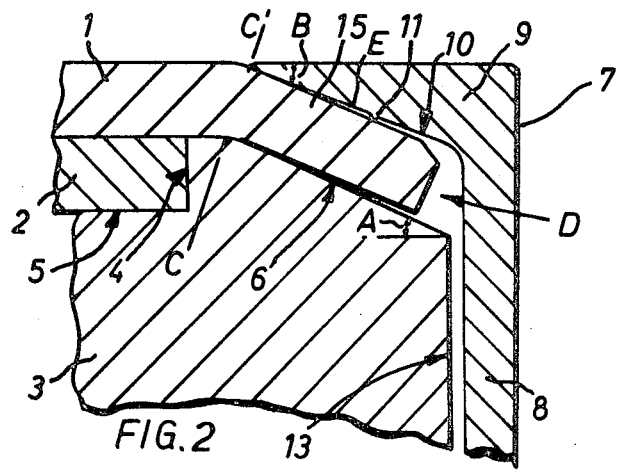
FIG. 2 is an enlarged view of part of the assembly of FIG. 1.

An enlarged elevation of part of the assembly just before the clamping plates 12 are bolted together is shown in FIG. 2. It will be seen that contact of the extending portion 15 of the elastomer lining is first made with the apex including angle B of the insert part 7 and as the clamping plates are bolted together the rib 11 embeds itself into the lining, and the faces 6 and 10 are then brought into sealing contact with the lining.

The assembly of the above embodiment is easily constructed and will accommodate inherent variations in wall thickness of the elastomer lining. Replacement of lengths of pipe in the assembly is easily accomplished, and the insertion of a length of fiberglass-resin pipe into an existing elastomer-lined steel pipe assembly is possible.

The inserts 7 and collars 3 may, if desired, include one or more ribs on the faces 10 and 6 respectively to provide high pressure sealing properties.

The acute angles A and B need not be like and preferably A is greater than B for the following reasons. Referring to FIG. 2, it will be seen that the apex including angle B contacts the lining first, causing it to deflect about CC, and bringing it into contact with face 6 of the collar 3 almost immediately. As the insert part 7 is pushed into position its frusto-conical face 10 will progressively be brought into contact with the lining. Progressive compression of the lining between faces 6 and 10 will take place, starting at the apex, and as this compression takes place the lining will tend to elongate away from the apex including angle B towards space D rather than towards CC where the lining 1 is bonded to the fiberglass-resin outer shell 2. This is assisted by angle A being greater than angle B, resulting in gap E being maintained immediately behind the area of first contact, so that elongation can take place freely. If the gap were not present then the tendency would be for the lining to be pushed towards CC causing an obstruction in the bore. Final tightening of the assembly brings all the contact faces into sealing engagement and substantially all displacement of the lining due to compression takes place in space D.

In order to check the efficiency of the embodiment of the invention described above the following test procedure was carried out.

Two-2 ft. lengths of elastomer-lined pipe of 3 inches internal diameter were fitted at their ends with coupling flanges comprising clamping plates 12 and collars 3. The pipe lengths were assembled as in FIG. 1, utilising insert parts 7 of polypropylene for which acute angle B was 20°. The collar 3 was of fiberglass-resin material and acute angle A was 23°. A rubber washer 14 of thickness 1/16 inch was placed between the insert parts 7.

The other ends of the pipe lengths were blanked off with flat metal annular end plates. One of the end plates was fitted with an air bleed cock and the other end plate was connected to a high pressure water supply via a suitable stop valve. A pressure gauge was included between the stop valve and the pipe lengths.

With air bleed open, the pipe assembly was filled with water until all the air had been expelled and the cock was then closed. Hydraulic pressure within the pipe assembly was then increased in stages of 100 lb./sq. in. until the pressure was within 100 lb./sq. in. of the known bursting pressure of the pipe lengths. At each stage the assembly was examined for leakage and was found to be satisfactory, thus indicating a pipe assembly of great strength.

The assembly was then dismantled and no faults were evident in any of the component parts.

Figure 3:
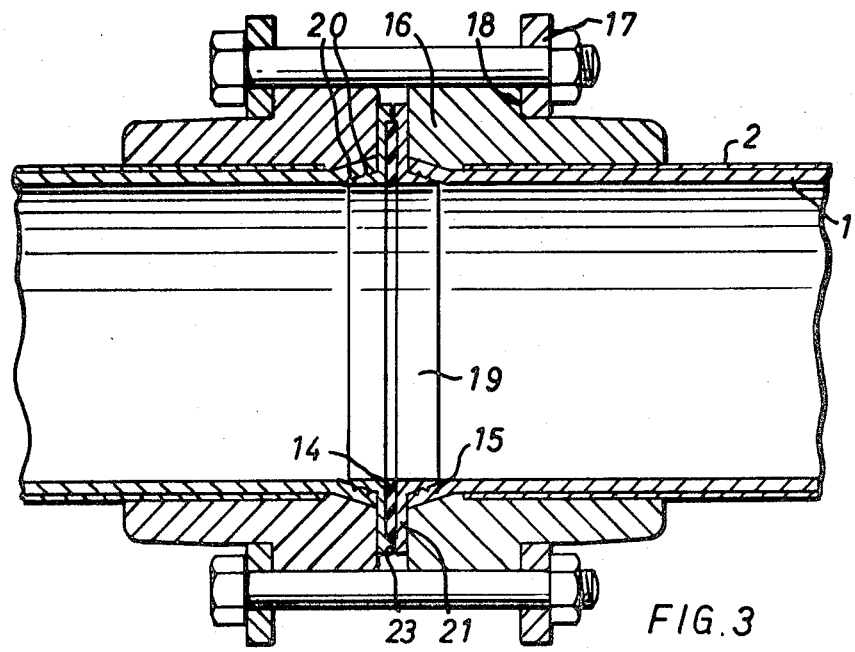
FIG. 3 is a sectional elevation of a modified assembly of two lengths of elastomer-lined fibreglass-resin pipe.

In a modification of the above embodiment of the invention, illustrated in FIG. 3, the annular coupling flanges each comprise a fiberglass-resin collar or stub flange 16 which replaces the collar 3 of FIG. 1 and a clamping plate or flange 17 which replaces the clamping plate 12 of FIG. 1. The collar 16 provides an increased area of contact between the collar and the fiberglass-resin shell 2 of the pipe length, thus increasing the strength of the assembly. It also has a shoulder 18 against which the clamping plate 17 abuts; this feature reduces the length of the bolt required to assemble the pipe lengths together and also reduces the size and weight of the clamping plate required since the inner diameter of the latter has been increased.

Figure 4:
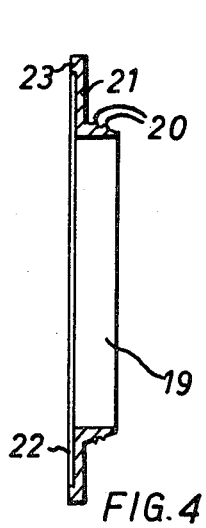
FIG. 4 is an enlarged view of the annular insert part in the assembly of FIG. 3.

The insert parts 7 of FIG. 1 are replaced by the polypropylene insert parts 19. The frusto-conical face of each part 19 is provided with two annular ribs 20 rather than the one annular rib 11 of each part 7, increasing the efficiency of the seal between the extending portion 15 of the elastomer lining 1 and the insert parts. The integral flanged section 8 of each part 7 is replaced by the integral flanged section 21 of each part 19. The section 21 has a recess 22 on its inner face, as shown in FIG. 4. In the pipe assembly the washer 14 lies in the recesses 22 and its outer periphery is enclosed by the unrecessed portions 23 on the inner face of the sections 21; this prevents any tendency of the washer to "blow out" when under pressure.

The modified assembly is constructed in a similar manner to the assembly of FIG. 1 as described above.

Figure 5:
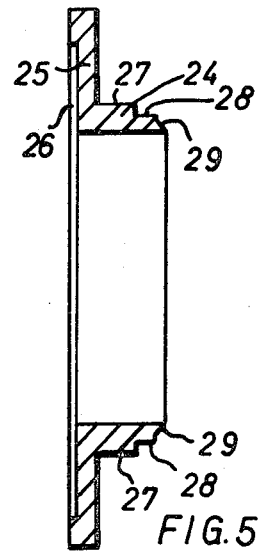
FIG. 5 is a sectional view of a modified annular insert part.

In a further embodiment of the invention, the insert parts 7 of FIG. 1 or insert parts 19 of FIGS. 3 and 4 are replaced by insert parts having a tapering stepped surface in sealing contact with the inner surface of the extending portion of the respective elastomer lining. Such an insert part is illustrated in FIG. 5; it has a stepped section 24 with an integral flanged section 25. The section 25 has a recess 26 on its inner surface for the same purpose as the recess 22 of FIG. 4. The stepped section 24 has two substantially parallel faces 27 and 28 and a frusto-conical face 29. In the assembly the extending portion of the respective elastomer lining may be in sealing contact with all three faces.

The efficiency of these modified assemblies was tested using the procedure previously described. Again the hydraulic pressure in the assemblies was increased to within 100 lb./sq. in. of the known bursting pressure of the pipe lengths. No leakage was observed, again indicating a pipe assembly of great strength.

It will be apparent that the present invention enables long tubular members such as lengths of pipe to be manufactured which may be delivered as such to the user together with the other components of the kit of parts for an assembly. The tubular members may then be cut to any desired individual length and coupled together as described above.

Where the individual lengths of the tubular members required by the user are known it may be more convenient to cut back the outer shell of the tubular members to expose the lining and place the coupling flanges in position on the tubular members before delivery to the user, together with the annular insert. The user then has to locate the annular insert between two tubular members to be joined and clamp the coupling flanges together as described above. Conveniently, where a coupling flange is in two annular parts, the part accommodating the means for clamping the flanges together is slipped over the end of the tubular member and the part providing the inner face to bear against the outer surface of the extending portion of the lining is placed in position on the tubular member and bonded to the outer shell as described above, before delivery to the user.

We claim:
1. An assembly of tubular members comprising:
(a) two tubular members each having an outer shell and an inner protective lining and being coupled together at adjacent ends, a portion of the lining of each tubular member extending beyond the outer shell at the respective adjacent end, each of said members carrying an annular coupling flange having an inner face adjacent the surface of the extending portion of the respective lining, said inner face lying at an acute angle to the longitudinal axis of the tubular member, the coupling flanges being clamped together, and
(b) an annular insert between the tubular members, having a slanting face adjacent the inside surface of the extending portion, said slanting face lying at an acute angle to the longitudinal axis of the tubular members, at least part of the extending portion of each lining being compressed between said slanting face and said inner face of the respective coupling flange, the inner surface thereof in fluid-tight sealing contact with said slanting face and the outer surface thereof in fluid-tight sealing contact with said inner face, the acute angle of said inner face to the longitudinal axis being greater than the acute angle of said slanting face to the longitudinal axis so that upon tightening the coupling, the compression will tend to elongate the lining away from the outer shell.

2. The assembly of claim 1 in which the annular insert has an internal diameter equal to the internal diameter of said lining so that no construction to flow of fluid through the coupled members is present.

References Cited

UNITED STATES PATENTS

| 2,011,433 | 8/1935 | Blagg et al. | 285—334.2 X |
| 3,151,869 | 10/1964 | Butcher | 285—55 X |
| 3,374,450 | 3/1968 | Stewart | 285—334.5 X |
| 3,399,908 | 9/1968 | Kurtz | 285—55 |
| 2,289,382 | 7/1942 | Parker | 285—334.5 X |
| 3,228,096 | 1/1966 | Albro | 285—55 X |
| 3,199,879 | 8/1965 | Fleming | 285—55 X |
| 1,058,542 | 4/1913 | Brown | 285—334.5 X |
| 2,333,909 | 11/1943 | Williams | 285—334.5 X |

FOREIGN PATENTS

| 1,142,066 | 3/1957 | France | 285—334.5 |
| 904,975 | 9/1962 | Great Britain | 285—55 |
| 1,268,406 | 6/1961 | France | 285—55 |

THOMAS F. CALLAGHAN, Primary Examiner

U.S. Cl. X.R.

285—334.2, 334.5, 368